United States Patent
Friday et al.

(10) Patent No.: US 8,292,991 B2
(45) Date of Patent: *Oct. 23, 2012

(54) GAS MASK FILTER CANISTER

(75) Inventors: David K. Friday, Cockeysville, MD (US); John Schlaechter, Columbus, OH (US); Wayne E. Ballantyne, Columbus, OH (US); Robert J. Puhala, Frederick, MD (US); David W. Pike, Salisbury (GB)

(73) Assignee: Avon Protection Systems, Inc., Cadillac, MI (US)

( * ) Notice: Subject to any disclaimer, the term of this patent is extended or adjusted under 35 U.S.C. 154(b) by 1378 days.

This patent is subject to a terminal disclaimer.

(21) Appl. No.: 11/930,645

(22) Filed: Oct. 31, 2007

(65) Prior Publication Data

US 2012/0167889 A1  Jul. 5, 2012

Related U.S. Application Data

(63) Continuation of application No. 10/512,540, filed as application No. PCT/US03/12787 on Apr. 25, 2003, now Pat. No. 7,311,764.

(60) Provisional application No. 60/319,207, filed on Apr. 26, 2002.

(51) Int. Cl.
 *B01D 53/02* (2006.01)
(52) U.S. Cl. .................. 96/134; 55/DIG. 33; 128/201.25
(58) Field of Classification Search ............. 55/DIG. 33; 96/134, 135, 147; 128/201.25
See application file for complete search history.

(56) References Cited

U.S. PATENT DOCUMENTS

| | | | |
|---|---|---|---|
| 2,227,959 A | 1/1941 | Cover | |
| 3,944,403 A | 3/1976 | Simpson et al. | |
| 4,334,901 A | 6/1982 | Ayes et al. | |
| 4,592,350 A | 6/1986 | Maryyanek et al. | |
| 4,977,634 A | 12/1990 | Koji | |
| 5,019,311 A | 5/1991 | Koslow | |
| 5,052,385 A | 10/1991 | Sundstrom | |
| 5,078,132 A | 1/1992 | Braun et al. | |
| 5,158,077 A | 10/1992 | Sundstrom | |
| 5,714,126 A | 2/1998 | Frund | |
| 6,146,449 A | 11/2000 | Lee et al. | |
| 6,176,239 B1 | 1/2001 | Grove et al. | |
| 6,860,267 B2 | 3/2005 | Capon et al. | |
| 7,311,764 B2 * | 12/2007 | Friday et al. .................. 96/134 |

FOREIGN PATENT DOCUMENTS

| | | |
|---|---|---|
| DE | 891052 | 9/1953 |
| DE | 891499 | 9/1953 |
| EP | 0764452 | 3/1997 |
| FR | 1158291 | 6/1958 |
| GB | 516268 | 12/1939 |
| JP | 63071270 | 3/1988 |
| JP | 04081286 | 5/1994 |
| WO | 0178839 A2 | 10/2001 |

* cited by examiner

*Primary Examiner* — Duane Smith
*Assistant Examiner* — Sonji Turner
(74) *Attorney, Agent, or Firm* — McGarry Bair PC

(57) ABSTRACT

A filter for a gas mask has a concave outlet wall and a convex inlet wall with a particulate filter bed that has a uniform depth and conforms substantially to the shape of the inlet and outlet wall. The side wall can have an elliptical, circular or convex shape to conform to the curvature of the wearer's face, or a planar shape. The filter an be a double particulate filter element and a double adsorption filter element configured for axial airflow therethrough with a bifurcated flow pattern. The adsorption filter element comprises a granulated charcoal, a composite material having carbon particles combined with binder particles, or an immobilized bed of charcoal granules and EVA-coated fibers.

15 Claims, 4 Drawing Sheets

US 8,292,991 B2

GAS MASK FILTER CANISTER

CROSS-REFERENCE TO RELATED APPLICATION

This application is a continuation of U.S. patent application Ser. No. 10/512,540, filed: Oct. 22, 2004, now U.S. Pat. No. 7,311,764, issued Dec. 25, 2007, which claims priority of International Application No. PCT/US03/12787, filed Apr. 25, 2003, which claims the benefit of U.S. Provisional Patent Application 60/319,207, filed Apr. 26, 2002, all which are incorporated herein by reference in their entirety.

GOVERNMENT INTEREST

This invention was made with government support under DAAD13-00-C-0021 by the Department of Defense (US Special Operations Command). The government has certain rights in this invention.

BACKGROUND OF THE INVENTION

1. Field of the Invention

The invention relates to gas masks and filter canisters therefor. In one aspect, the invention relates to a filter canister having a profile that conforms to the curvature of the wearer's face. In another aspect, the invention relates to a gas mask with a mask housing and a filter cartridge that conforms to the face of the wearer. In another of its aspects, the invention relates to a low profile filter canister

2. Description of the Related Art

PCT International Publication No. WO 01/78839, published Oct. 25, 2001, discloses a bayonet-type connector for connecting a removable filter to a gas mask. A filter canister comprising a hollow container having an oval shape is also disclosed, with parallel planar top and mounting surfaces separated by a perimeter wall. The canister is mounted to the mask with a twist and lock mechanism for quick change of spent canisters. A secondary filter for treating toxic industrial materials is disclosed for adding to the primary canister as necessary by a twist and lock mechanism.

U.S. Pat. No. 5,019,311 to Koslow, issued May 28, 1991, discloses a process for producing a composite material having carbon particles combined with binder particles which, through heat and pressure, are formed into a substantially uniform, stabilized mixture which can retain a preselected shape.

Conventional replaceable circular or elliptical gas mask filters with parallel planar top and mounting surfaces can be mounted to one or to both sides of the mask and extend laterally outwardly of the mask. Such filters typically comprise a folded paper or fabric particulate filter and a granulated carbon adsorption filter. In order to maximize the density of the carbon granules and avoid introducing flow channels through the adsorption filter, the granulated carbon is typically placed in the filter canister through a process of "snow storm filling" the granulated carbon into the filter in such a way that the density of the granules is maximized. This process requires that the top and mounting surfaces be flat.

Laterally-mounted filters with flat top and mounting surfaces extend outwardly of the wearer's face, and can interfere with the wearer's vision and activities (e.g. sighting a firearm), or contact objects in close proximity to the wearer, potentially damaging the filter and rendering it inoperative, and injuring the wearer. Because the auxiliary filter further extends outwardly of the mask, the use of an auxiliary filter can exacerbate the problems inherent with the outwardly extending primary filter.

Filters having a curved section to conform closely to the curvature of the wearer's face can mitigate many of the problems associated with conventional filters having flat top and mounting surfaces. However, the curvature of the filter interferes with the conventional "snow storm filling" method of placing the carbon filter granules in the filter canister, and can prevent the granules from assuming a sufficient density. As well, the curvature of the filter canister can cause unacceptable variations in the thickness of the carbon layer, leading to insufficient protection of the wearer.

A mask with dual filter units shaped to conform to the shape of the face is disclosed in U.S. Pat. No. 5,078,132 and U.S. Pat. No. 6,176,239. The filter units are of a non-circular shape and appear to be molded of a particulate filter material with a binder.

SUMMARY OF THE INVENTION

According to the invention, a filter canister for a gas mask has a housing with an upper wall, a lower wall, and a side wall; an inlet opening in the upper wall and an outlet opening in the lower wall; the lower wall further including a connector, defining the outlet opening, for removably mounting the canister to the gas mask; and at least one filter element within the housing and forming an axial airflow path between the inlet and the outlet openings, wherein the upper wall is convex and the lower wall is concave to conform the filter canister to the face of the user.

In one embodiment, the least one filter element comprises an adsorption bed and preferably comprises at least one of a granulated charcoal and a composite material having carbon particles combined with binder particles. In a preferred embodiment, adsorption filter bed comprises activated charcoal impregnated with at least one of copper, zinc, silver, molybdenum and triethylenediamine.

In a preferred embodiment, the at least one filter bed has a concave surface that faces the lower wall and a convex surface that faces the upper wall. In addition, the at least one filter bed further comprises a particulate granulated adsorption material.

The side wall of the filter canister can take a number of different shapes. In one embodiment, the side wall is elongated or elliptically shaped.

Further according to the invention, a gas mask assembly comprises a mask housing having filter mount defining an inlet port for mask housing and a filter canister as described above removably mounted to the filter mount in close proximity to the mask housing to conform the filter canister to the face of the mask user.

In one embodiment, the filter mount and the filter canister connector comprise twist and lock connectors. Typically, the mask has a self sealing mechanism mounted in the inlet port for sealing the inlet port when the filter canister is removed from the mask housing.

In a further embodiment, the upper wall has a second connector for mounting an auxiliary filter canister and an auxiliary filter canister is mounted to the second connector. The auxiliary canister has an inlet wall, an outlet wall, a side wall, an inlet opening in the inlet wall, an outlet opening in the outlet wall and an auxiliary filter medium adapted to remove TIM (toxic industrial materials) contaminants from air mounted within the auxiliary filter canister. The canister further defines an air flow path through the auxiliary filter medium between the inlet opening and the outlet opening in the auxiliary filter canister and a third connector is mounted to the outlet wall of the auxiliary filter canister and is adapted to connect to the second connector to mount the auxiliary filter canister to the filter canister for airflow serially therethrough.

Preferably, the auxiliary filter medium comprises copper sulfate-impregnated activated carbon.

Further, the second and third connectors can be twist and lock connectors and can be conventional threaded connections. When the second and third connectors are twist and lock connectors, the side wall of the auxiliary canister can be elliptically shaped.

DESCRIPTION OF THE PREFERRED EMBODIMENT

Figure 1:
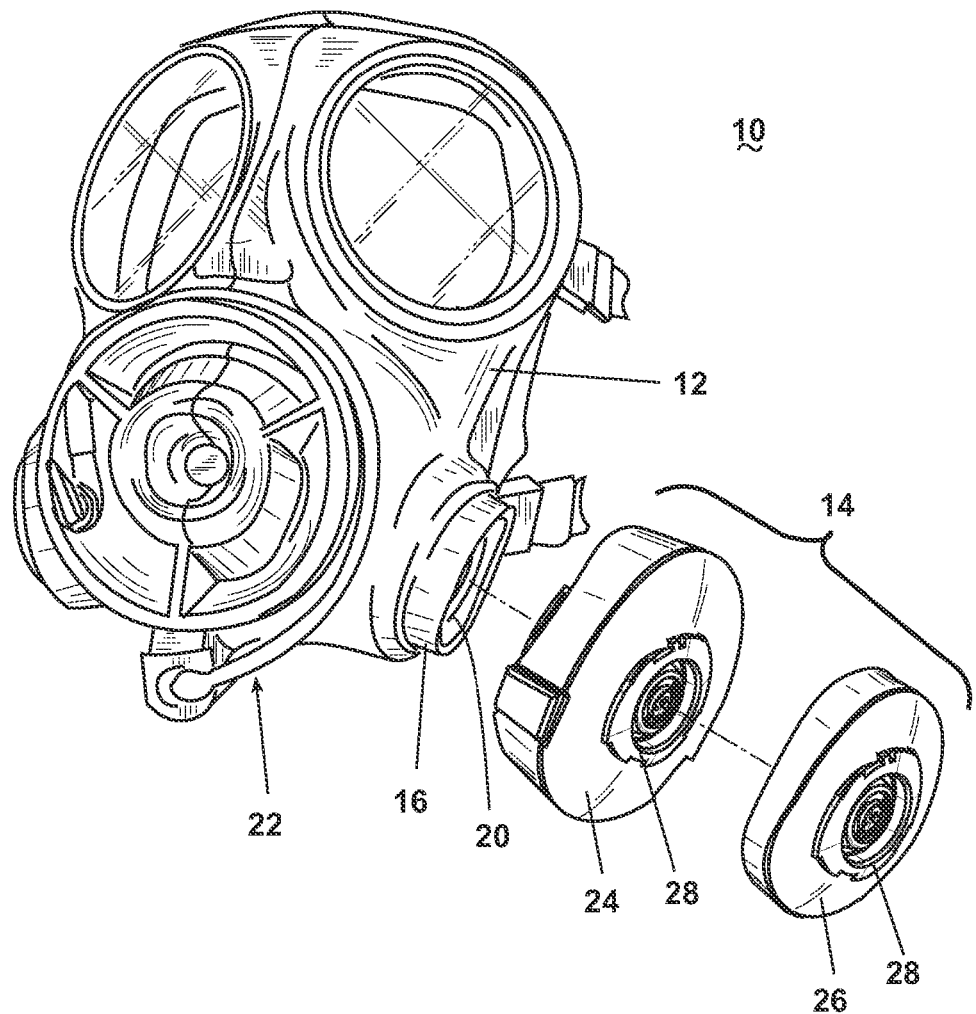
FIG. 1 is an exploded perspective view of a gas mask and filter assembly comprising a primary filter and an auxiliary filter according to the invention.

A gas mask assembly 10 according the invention is shown in FIGS. 1-4. As shown in FIG. 1, the assembly 10 comprises a mask housing 12 and a filter assembly 14. The mask housing 12 comprises a filter mount 16 at lower lateral portions of the mask housing 12, comprising a self-sealing mechanism (not shown) as disclosed in PCT International Publication No. WO 01/78839, published Oct. 25, 2001, and incorporated herein by reference, and an inlet port 20. The inlet port 20 is preferably provided with a twist and lock or bayonet filter mount as disclosed in PCT International Publication No. WO 01/78839. A conventional female-type threaded connector can also be utilized. The mask housing 12 can also comprise a speech module 22 that combines the functions of voice projection and drinking. Such a speech module is disclosed in PCT Application No. US02/22591, published Jan. 30, 2003.

In the preferred twist and lock configuration shown in PCT International Publication No. WO 01/78839, the base of the filter is fitted with three lugs and an orientation notch so that it can only fit one way on the mating filter mount on the mask housing 12 or face piece. The action of twisting the filter activates two locks on the filter such that the filter cannot inadvertently be released. Two clip locks on the filter are of a living hinge type such that they must both be pressed simultaneously in order to release the filter to untwist it from its locked position on the filter mount. A rubber seal is fitted to the filter that also acts under compression at the base of the filter mount. The seal also wipes the side of the filter mount as it is fitted. The process of seating the filter and an additional feature on the filter activates a self-sealing valve that opens when the filter is attached but closes when the filter is removed. This permits the user to change filters while being in a contaminated environment should the need arise. A suitable self-sealing valve has been disclosed in PCT International Publication No. WO 01/78839.

Figure 2:
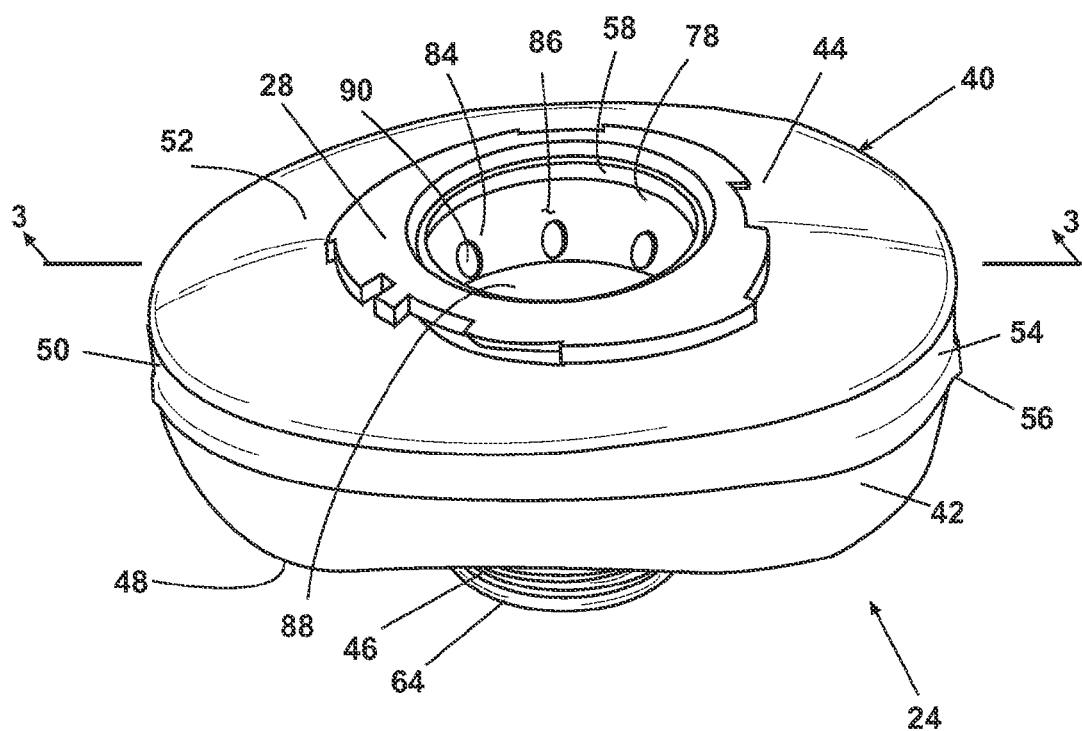
FIG. 2 is a perspective view of the primary filter of FIG. 1.

As shown in FIG. 1, the filter assembly 14 comprises a primary filter 24 and an auxiliary filter 26. The primary filter 24 is provided with a connector 46, which is shown in FIG. 2 as comprising a male-type threaded connector for matingly interconnecting with female-type threads of the inlet port 20 of the mask housing 12, for mounting the primary filter 24 to the mask housing 12. As discussed above, the primary filter 24 and the inlet port can preferably be provided with a twist and lock connector as disclosed in PCT International Publication No. WO 01/78839. The auxiliary filter 26 is preferably mounted to the primary filter 24 through a similar twist and lock or threaded connection such as disclosed in the PCT International Publication No. WO 01/78839. FIGS. 1 and 2 show the use of a twist and lock connector 28 for connecting the auxiliary filter 26 to the primary filter 24.

Figure 3:
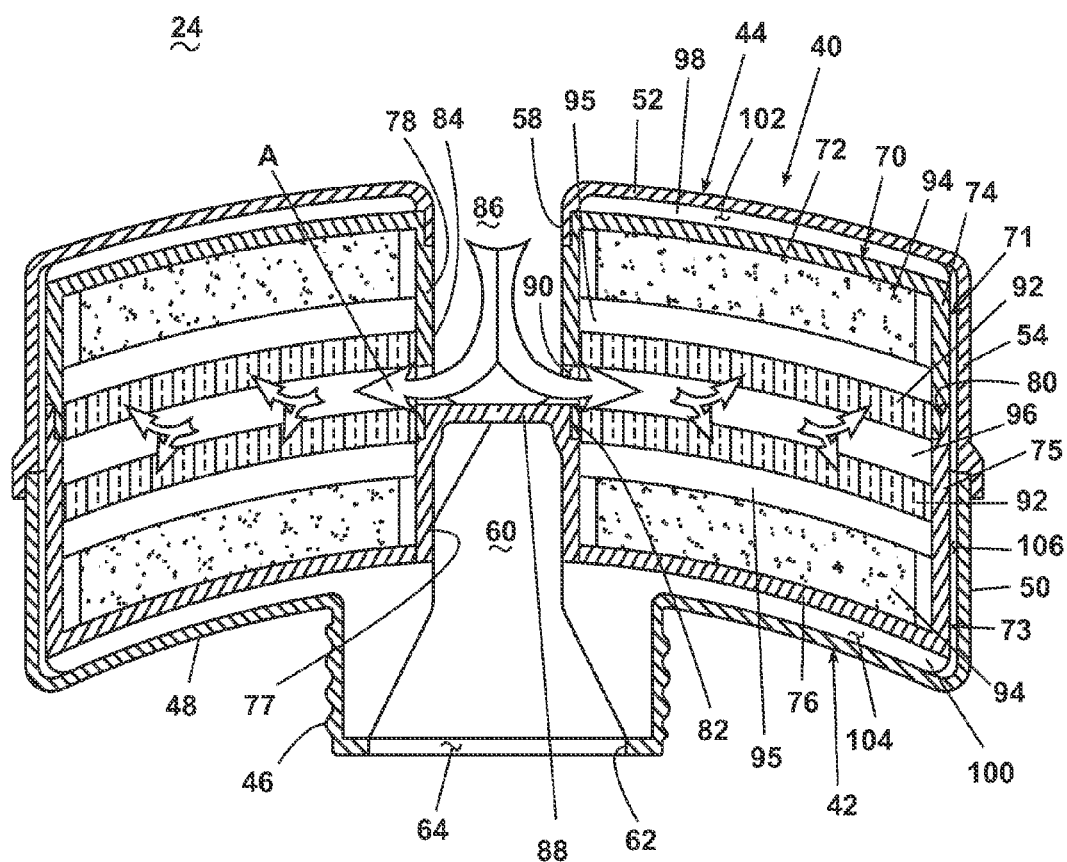
FIG. 3 is a sectional view of the primary filter taken along line 3-3 of FIG. 2.

Referring now to FIGS. 2 and 3, the primary filter 24 comprises an elliptically-shaped primary filter canister 40 having a canister base 42 and a canister cover 44. The canister base 42 comprises a canister floor 48, a connector 46 extending axially outwardly therefrom, and a canister peripheral wall 50 extending generally orthogonally from the canister floor 48. The canister cover 44 comprises a top wall 52 and a cover peripheral wall 54 extending generally orthogonally therefrom. The peripheral wall 54 terminates in a downwardly depending, perimeter outer lip 56. The top wall 52 terminates in a downwardly depending inner lip 58. The canister cover 44 is joined to the canister base 42 with the perimeter outer lip 56 extending over an upper end of the peripheral wall 50 to form the circular, or elliptical, generally doughnut-shaped canister 40 having the connector 46 and defining an interior chamber 60.

The connector 46 comprises an outlet aperture 62 defining a filter outlet opening 64 for fluid communication with the inlet port 20 when the primary filter 24 is attached to the mask housing 12.

The chamber 60 holds an elliptical, generally doughnut-shaped primary filter element 70. The filter element 70 comprises a top portion 71 and a bottom portion 73. The top portion 71 comprises an elliptical ring-shaped top wall 72, a downwardly depending elliptical outer sidewall 74 connected thereto, and a downwardly depending circular inner sidewall 78 connected to the top wall 72 and uniformly spaced inwardly of the outer sidewall 74. The inner sidewall 78 is provided with radially spaced filter apertures 90 at a lower portion thereof The bottom portion 73 comprises an elliptical bottom wall 76, an upwardly-extending elliptical outer sidewall 75 connected thereto, an upwardly extending circular inner sidewall 77 connected to the bottom wall 76 and uniformly spaced inwardly of the outer sidewall 75, and a centrally-located circular inlet floor 88 connected to the inner sidewall 77 orthogonal thereto. The inner sidewall 78 forms a center inlet aperture 84 to define a cylindrical filter inlet opening 86 terminating at the inlet floor 88. The filter inlet opening 86 can optionally be covered with an integral grille piece (not shown) to prevent large particles, such as sand or other debris, from entering the filter 24.

The top portion 71 and the bottom portion 73 matingly communicate to form the primary filter element 70 by joining the outer sidewall 74 to the outer sidewall 75 at a suitable outer wall joint 80, and joining the inner sidewall 78 to the inner sidewall 77 at a suitable inner wall joint 82. The joints 80, 82 comprise rigid, airtight joints. The top wall 72 and the bottom wall 76 are provided with a plurality of apertures (not shown) extending therethrough for fluid communication of the interior of the filter element 70 with the chamber 60.

The primary filter element 70 comprises a pair of spaced-apart, ring-shaped particulate filter elements 92 of uniform thickness and a pair of spaced-apart, ring-shaped adsorption filter elements 94 of uniform thickness enclosed therein, separated by a ring-shaped perforated retainer 95 and arranged in a stacked relationship. The particulate filter elements 92 extend from the inner sidewalls 77, 78 to the outer side walls 74, 75. In FIG. 3, the particulate filter elements 92 are shown separated by an inlet channel 96 in fluid communication with the filter apertures 90.

The adsorption filter elements 94 extend from the inner sidewalls 77, 78 to the outer side walls 74, 75. The adsorption filter elements 94 are shown spaced from the particulate filter elements 92 with the intervening retainer 95. However, the adsorption filter elements 94 can be separated from the particulate filter elements 92 by a permeable membrane, or can be stacked in contact with one another. The retainer 95 extends from the inner sidewalls 77, 78 to the outer side walls 74, 75, and is fixedly attached thereto, preferably by ultrasonic welding.

The primary filter element 70 is provided with a plurality of radially-extending upper ribs 98 extending upwardly from the top wall 72 and a plurality of radially-extending lower ribs 100 extending downwardly from the bottom wall 76. The upper ribs 98 bear against the underside of the top wall 52 and the lower ribs 100 bear against the underside of the canister floor 48 to retain the filter element 70 in a fixed position relative to the primary filter canister 40 and form upper radial air flow channels 102 and lower radial air flow channels 104 along the top and bottom, respectively, of the filter element 70. Additionally, the outer walls 74, 75 of the filter element 70 terminate somewhat short of the outer walls 50, 54 of the primary filter canister 40 to form a vertical, annular air flow channel 106 between the upper flow channel 102 and the lower flow channel 104.

Figure 4:
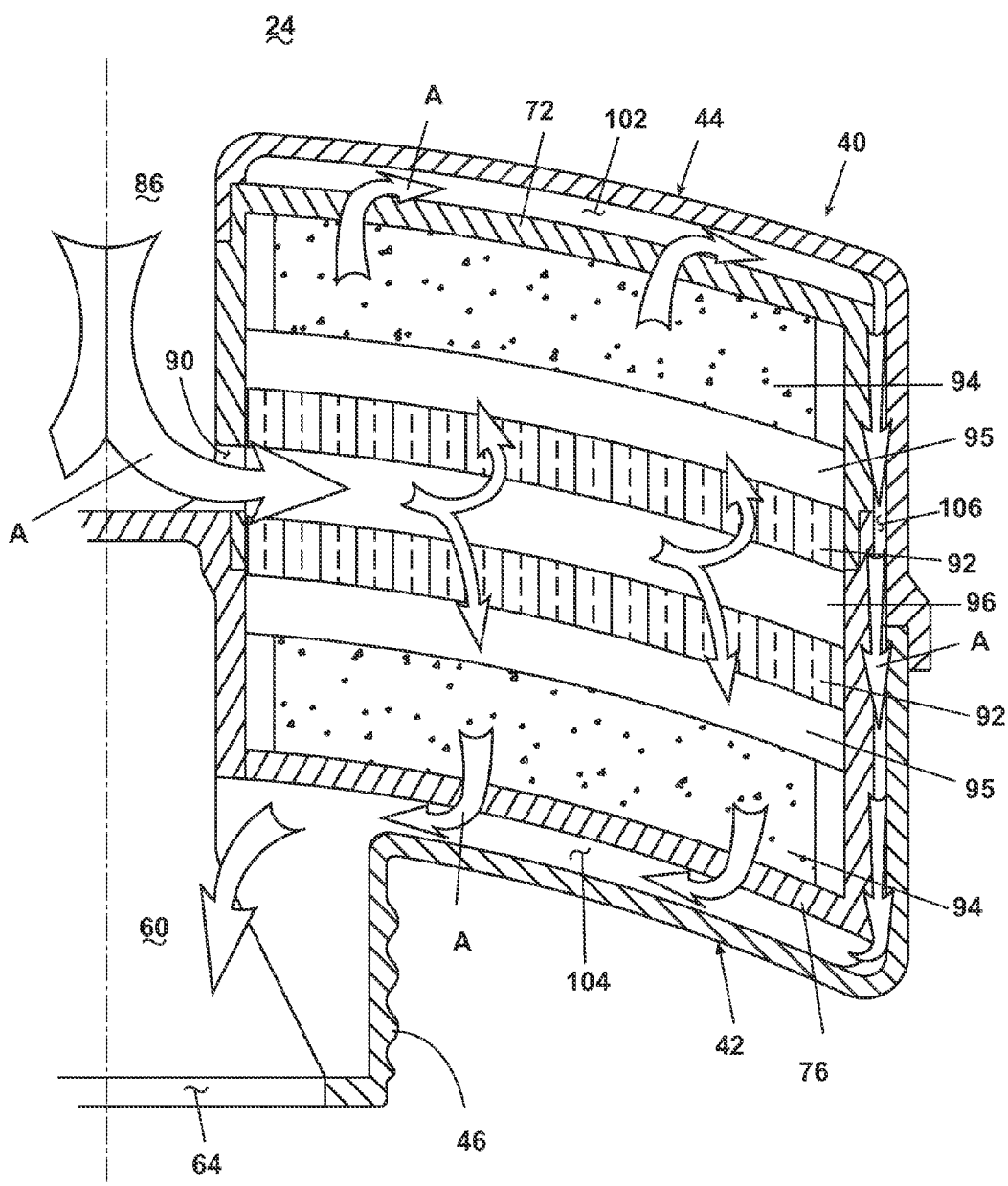
FIG. 4 is a view of a portion of the filter of FIG. 3 showing the flow of air through the filter.

Referring to FIG. 4, the flow of air through the filter 24 is indicated by the arrows designated as "A". Air is introduced into the primary filter 24 through the filter inlet opening 86, and into the primary filter element 70 through the filter apertures 90. The air proceeds through the inlet channel 96 and then flows upwardly and downwardly through the particulate filter elements 92. After exiting the particulate filter elements 92, the air flows through the retainer 95 and then through the adsorption filter elements 94 to exit the filter element 70 through apertures in the top wall 72 and the bottom wall 76. Air exiting through the bottom wall 76 flows downwardly into the lower flow channel 104. Air exiting through the top wall 72 flows upwardly into the upper flow channel 102, then radially to the vertical flow channel 106, then downwardly into the lower flow channel 104. Air flows radially out of the lower flow channel 104 to exit the primary filter canister 40 through the filter outlet opening 64 and into the mask housing 12.

The particulate filter element 92 removes aerosols, particulate materials, and droplets from contaminated air, and can comprise any particulate filtration media suitable for removing aerosols, particulate materials, and droplets, including pleated sheets, electrostatically-charged fibers or fiberglass paper in a suitable configuration for the axial air flow described herein. Preferably, the particulate filter element 92 comprises an electrostatically-charged, nonwoven fabric manufactured by 3M Company and sold under the product name AEM5.

The adsorption filter element 94 preferably comprises a granulated activated charcoal impregnated to provide protection against military war gases with heavy metals salts, such as copper, silver, zinc and molybdenum salts, and also of amine triethylenediamine The impregnants react chemically with the low boiling point compounds in order to retain them on the charcoal. Other conventional impregnated charcoals or alumina suitable for military applications can be used, as can non-impregnated charcoals for filters to be used in industrial rather than military applications. As an example, a copper sulfate-treated charcoal can be used in an environment containing ammonia.

The granulated charcoal comprising the pair of adsorbent filter elements 94 is held between the top wall 72 or canister floor 48, the side walls 74, 75, 77, 78, and the retainers 95, and is placed into the filter element 70 by a suitable process, preferably vibratory filling, in order to achieve a specified density. Nonwoven fines filters (not shown) separating the adsorbent filter elements 94 from the top wall 72, the canister floor 48, and the retainer 95 are used to prevent small charcoal granules from migrating through the top wall 72, the canister floor 48, and the retainers 95. As seen in FIGS. 3 and 4, the adsorbent filter elements 94 have a concave lower surface defined by bottom wall 76 that faces the canister base 42 and generally conforms to the concave shape thereof The adsorbent filter elements 94 further have a convex upper surface that faces the canister cover 44 and which generally conforms to the convex shape thereof.

One example of a process for placing the granulated charcoal into the filter is described in WO 03/090872 A1, which is incorporated herein by reference. The process proceeds generally as follows. The fines filters are first bonded to the top wall 72, the bottom wall 76, and the retainers 95 by ultrasonic welding. The retainers 95 are ultrasonically welded in position in the primary filter element 70. A 10 millimeter orifice (not shown) is provided in the filter element 70 through which the charcoal granules are introduced while the filter element 70 is operably supported on a vibrating platform (not shown). The magnitude of both horizontal and vertical forces is carefully controlled in order to impart sufficient energy into the charcoal granules to enable them to achieve an optimum packing density of approximately 0.62 grams per cubic centimeter. When filling is complete, a plug is placed into the 10 millimeter orifice and sealed, preferably by ultrasonic welding, to the filter element 70 to complete the enclosure of the granular bed.

Two cut packs each comprising three layers of 3M AEM5 are then cut to the correct filter shape and placed into the filter element 70 adjacent the retainers 95 to form the particulate filter elements 92. Particulate layers that contain a high proportion of polypropylene can be ultrasonically welded to the filter element 70. The outer side walls 74, 75 and the inner side walls 77, 78 are then ultrasonically welded together, the filter element 70 is placed into the filter canister 40, and the canister cover 44 is welded to the canister base 42.

Alternatively, the adsorption filter element 94 can comprise the PLEKX material manufactured by KX Corporation and disclosed in U.S. Pat. No. 5,019,311 to Koslow, issued May 28, 1991, and incorporated herein by reference. The PLEKX material comprises a composite material having carbon particles combined with binder particles which, through heat and pressure, are formed into a substantially uniform, stabilized mixture which can retain a preselected shape. As used herein, the PLEKX material is formed into an 8-layer stack bonded to form a filter pack by injection molding a surrounding sleeve of polymer, such as polypropylene or another elastomer, which is press-fit into the primary filter element 70.

Alternatively, the adsorption filter element 94 can comprise an immobilized bed of granulated activated charcoal fabricated from a mixture of charcoal granules and EVA-coated fibers, such as nylon or fiberglass-coated fibers. The fibers are cut to about 3 mm in length, and are combined with the charcoal granules in the approximate proportion of 20% by weight of the fibers to the granules. The mixture is heated to the melt-flow temperature of the EVA coating of the fibers, and formed into a preselected shape to conformably fit within the primary filter element 70.

As discussed previously, the filter canister 40 is shown having a threaded connection for connecting the filter canister 40 to the mask housing 12. A "twist and lock" or bayonet connector as described in PCT International Publication No. WO 01/78839 is preferably used to connect the filter canister 40 to the mask housing 12. An auxiliary filter 26 having a conformable elliptical shape or a conventional cylindrical shape to filter out toxic industrial materials or non-typical military contaminants can be mounted to the primary filter 24, preferably using a bayonet connection 28 as described in PCT International Publication No. WO 01/78839. The use of a secondary filter specific to toxic industrial chemicals (TIC) or toxic industrial materials (TIM) can be used to significantly extend the life of the primary filter.

There is a stated need to broaden the scope of performance of military filters to include a very wide range of toxic industrial chemicals that occur either as vapor or liquid droplets, solid/liquid aerosols, or particulate matter. Conventional military charcoals, being non-specific adsorbents to a great degree, possess the characteristics to remove many of these chemicals from the air stream. However, there are chemicals that are widely used in industrial processes and available in large quantities that possess toxicity high enough to be of concern to military personnel. Ammonia, formaldehyde, and ethylene oxide are three chemicals that cause such concern, and conventional military charcoals are not very effective against them. It is possible to increase the weight of charcoal adsorbent in the filter to improve protection against such chemicals, but this would impose a significantly increased burden on military personnel due to the additional weight, increased breathing resistance, and life cycle cost of the equipment. An effective way to reduce this burden is the use of the auxiliary filter 26 that can be added to the primary military filter as the need arises.

An example of how the combination of the primary and auxiliary filters works is described for the filtering of ammonia. A primary filter canister consisting of activated charcoal impregnated with copper, zinc, silver, molybdenum and triethylenediamine was challenged with a concentration of 1000 milligrams/meter$^3$ each of cyanogen chloride and ammonia. While the cyanogen chloride breakthrough was greater than 45 minutes, the ammonia breakthrough was less than 5 minutes. An auxiliary filter canister consisting of copper sulfate-impregnated activated carbon was attached to the primary filter and this new configuration was challenged with 1000 milligrams/meter$^3$ each of cyanogen chloride and ammonia. The breakthrough time for both cyanogen chloride and ammonia was greater than 45 minutes The auxiliary filter 26 can comprise a conventional TIC filter element arrangement or the unique filter element arrangement disclosed herein. As well, the primary filter 24 and auxiliary filter 26 can also be adapted to accept a hose fitting for use in military vehicles.

The unique filter assembly 14 disclosed herein improves the functionality of a conventional gas mask by conforming the primary filter 24 and the auxiliary filter 26 to the curvature of the wearer's face, thereby streamlining the profile of the mask and filter. The streamlined profile reduces the potential that the filters will interfere with the wearer's vision and activities (e.g. sighting a firearm), or contact objects in close proximity to the wearer, potentially damaging the filter and rendering it inoperative, and injuring the wearer. The improved adsorption filter element provides the desired filtering capability of a granulated activated charcoal filter in an elliptical, conformal filter.

Further, the bifurcated flow construction with the double particulate and adsorption filters reduce the airflow resistance through the filter compared with a comparable axial flow filter due to the increase in filtration surface area and the corresponding reduction in the face velocity. At the same time, the relatively low profile and the conformal shape minimize interference with normal activities. The filtration surface area is further increased by the elliptical shape of the filter.

The invention has been described with respect to a specific embodiment that represents the best mode for practicing the invention but should not be considered to limit the invention to any particular embodiment. The filter canister can be a circular shape or any complex shape as well as an elliptical shape. Further, the filter canister can be flat rather than conformal with the use of the bifurcated flow pattern disclosed above. Further, the method of attaching the filter canister to the mask housing can be the preferred twist and lock connector or can be threaded or any other known manner of releasably mounting the filter canister to the mask housing.

While the invention has been specifically described in connection with certain specific embodiments thereof, it is to be understood that this is by way of illustration and not of limitation. Reasonable variation and modification are possible within the scope of the foregoing description and drawings without departing from the spirit of the invention.

What is claimed is:

1. A filter canister for a gas mask having a housing with an upper wall, a lower wall, and a side wall, an inlet opening in the upper wall and an outlet opening in the lower wall, the lower wall further including a connector, defining the outlet opening, for removably mounting the canister to the gas mask, and at least one filter element within the housing and forming an axial airflow path between the inlet and the outlet openings, wherein:
   the upper wall is convex and the lower wall is concave to conform the filter canister to the face of a user.

2. The filter canister for a gas mask according to claim 1 wherein the least one filter element comprises an adsorption bed.

3. The filter canister for a gas mask according to claim 2 wherein the adsorption filter bed is at least one of a granulated charcoal and a composite material having carbon particles combined with binder particles.

4. The filter canister for a gas mask according to claim 2 wherein the adsorption filter bed comprises activated charcoal impregnated with at least one of copper, zinc, silver, molybdenum and triethylenediamine.

5. The filter canister for a gas mask according to claim 1 wherein the side wall is elliptically shaped.

6. The filter canister for a gas mask according to claim 1 wherein the at least one filter bed has a concave surface that faces the lower wall and a convex surface that faces the upper wall.

7. The filter canister for a gas mask according to claim 6 wherein the at least one filter bed further comprises a particulate granulated adsorption material.

8. The gas mask assembly comprising:
   a mask housing having filter mount defining an inlet port for mask housing; and
   a filter canister according to claim 1 removably mounted to the filter mount in close proximity to the mask housing to conform the filter canister to the face of the mask user.

9. The gas mask assembly according to claim 8 wherein the filter mount and the filter canister connector comprise twist and lock connectors.

10. The gas mask assembly according to claim 8 and further comprising a self sealing mechanism mounted in the inlet port for sealing the inlet port when the filter canister is removed from the mask housing.

11. The gas mask assembly according to claim 8 wherein the wherein the side wall of the canister is elliptically shaped.

12. The filter canister for a gas mask according to claim 8 wherein the upper wall has a second connector for mounting an auxiliary filter canister, and further comprising an auxiliary filter canister with an inlet wall, an outlet wall, a side wall, an inlet opening in the inlet wall, an outlet opening in the outlet wall and an auxiliary filter medium adapted to remove TIM (toxic industrial materials) contaminants from air mounted within the auxiliary filter canister; the canister further defining an air flow path through the auxiliary filter medium between the inlet opening and the outlet opening in the auxiliary filter canister; and a third connector mounted to the outlet wall of the auxiliary filter canister and adapted to connect to the second connector to mount the auxiliary filter canister to the filter canister for airflow serially therethrough.

13. The filter canister for a gas mask according to claim 12 wherein the auxiliary filter medium comprises copper sulfate-impregnated activated carbon.

14. The filter canister for a gas mask according to claim 12 wherein the second and third connectors are twist and lock connectors.

15. The filter canister for a gas mask according to claim 12 wherein the side wall of the auxiliary canister is elliptically shaped.

\* \* \* \* \*